United States Patent
Tsai et al.

(10) Patent No.: US 11,286,032 B2
(45) Date of Patent: Mar. 29, 2022

(54) BUTTERFLY FOLDING FAIRING

(71) Applicant: The Boeing Company, Chicago, IL (US)

(72) Inventors: Kevin R. Tsai, Seattle, WA (US); Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 16/556,842

(22) Filed: Aug. 30, 2019

(65) Prior Publication Data
US 2021/0061439 A1 Mar. 4, 2021

(51) Int. Cl.
*B64C 5/10* (2006.01)
*B64C 5/06* (2006.01)
*B64C 3/28* (2006.01)
*B64C 9/02* (2006.01)

(52) U.S. Cl.
CPC ............. *B64C 5/10* (2013.01); *B64C 3/28* (2013.01); *B64C 5/06* (2013.01); *B64C 9/02* (2013.01)

(58) Field of Classification Search
CPC .... B64C 9/02; B64C 5/10; B64C 3/50; B64C 5/08; B64C 9/18
See application file for complete search history.

(56) References Cited

U.S. PATENT DOCUMENTS

| 5,735,485 | A | * | 4/1998 | Ciprian | B64C 9/32 244/113 |
|---|---|---|---|---|---|
| 10,370,085 | B2 | * | 8/2019 | Dorsett | B64C 5/06 |
| 2008/0001036 | A1 | * | 1/2008 | Voogt | B64C 9/22 244/215 |
| 2013/0020432 | A1 | * | 1/2013 | Yogev | B64C 9/323 244/51 |

* cited by examiner

*Primary Examiner* — Richard R. Green
*Assistant Examiner* — William L Gmoser
(74) *Attorney, Agent, or Firm* — Felix L. Fischer (57) ABSTRACT

A flap support fairing system incorporates a fairing attached to a flap and deployed downward with the flap during flap extension. The fairing has an inboard butterfly portion mounted with an inboard hinge and an outboard butterfly portion mounted with in outboard hinge. A fairing deployment mechanism is responsive to flap extension and is configured to rotate the inboard butterfly portion laterally inboard about the inboard hinge relative to an airflow direction and to rotate the outboard butterfly portion laterally outboard about the outboard hinge relative to the airflow direction. Upon flap extension, rotation of the inboard and outboard butterfly portions reduces impingement of a core engine plume on the deployed fairing.

18 Claims, 14 Drawing Sheets

BUTTERFLY FOLDING FAIRING

BACKGROUND INFORMATION

Field

This disclosure relates generally to the field of aircraft flap systems and, more particularly to a flap deployment system having a flap support fairing with laterally rotatable butterfly portions.

Background

Aircraft employ flaps which deploy to increase camber and chord of the wings for enhanced aerodynamic efficiency in take-off and landing. In modern flap configurations, a main flap support extends beneath the wing and has a fairing. This fairing covers the structure which supports the flap and deployment mechanism, providing a better aerodynamic surface, and may extend past the trailing edge of the wing. A portion of such a fairing is typically attached to, and deploys with, the flap. In certain instances, alignment of the main flap support and fairing with an underwing mounted turbofan engine may result in exposure of the deployed fairing to a core of the exhaust stream from the engine. This can cause thermal and vibrational fatigue on the fairing and supporting structure.

SUMMARY

Exemplary implementations of the flap support fairing system incorporate a fairing attached to a flap and deployed downward with the flap during flap extension. The fairing has an inboard butterfly portion mounted with an inboard hinge and an outboard butterfly portion mounted with in outboard hinge. A fairing deployment mechanism is responsive to flap extension and is configured to rotate the inboard butterfly portion laterally inboard about the inboard hinge relative to an airflow direction and to rotate the outboard butterfly portion laterally outboard about the outboard hinge relative to the airflow direction. Upon flap extension, rotation of the inboard and outboard butterfly portions reduces impingement of a core engine plume on the deployed fairing.

BRIEF DESCRIPTION OF THE DRAWINGS

The features, functions, and advantages that have been discussed can be achieved independently in the various implementations in the present disclosure or may be combined in yet other implementations further details of which can be seen with reference to the following description and drawings.

DETAILED DESCRIPTION

The implementations described herein provide a butterfly fairing that splits into two halves as the fairing deploys with the flap. By splitting and rotating in a lateral direction, the two halves of the fairing remain substantially clear of a core of the engine exhaust plume.

Figure 1A:
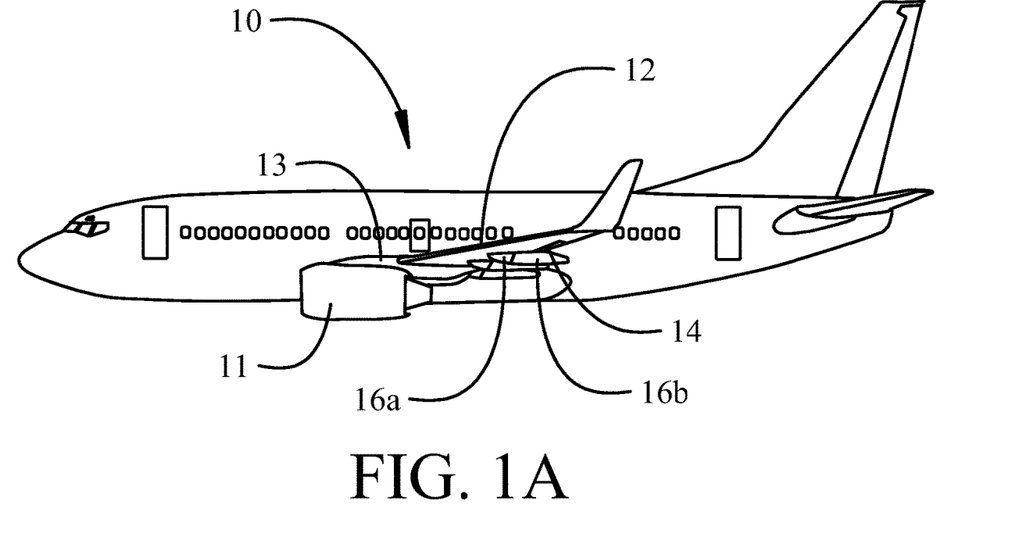
FIG. 1A is a representation of an aircraft in which the implementations disclosed herein may be employed.
Figure 1B:
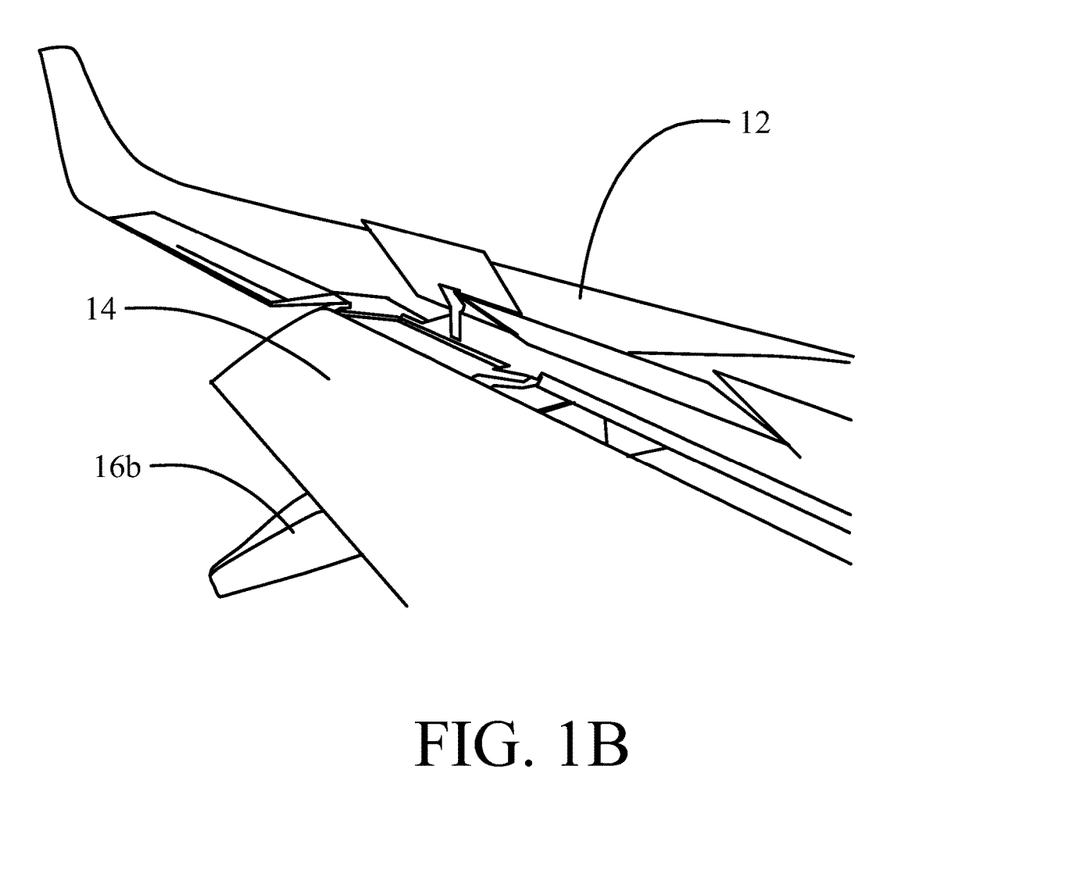
FIG. 1B is a detailed pictorial representation of the wing and flap of the aircraft of FIG. 1A.
Figure 1C:
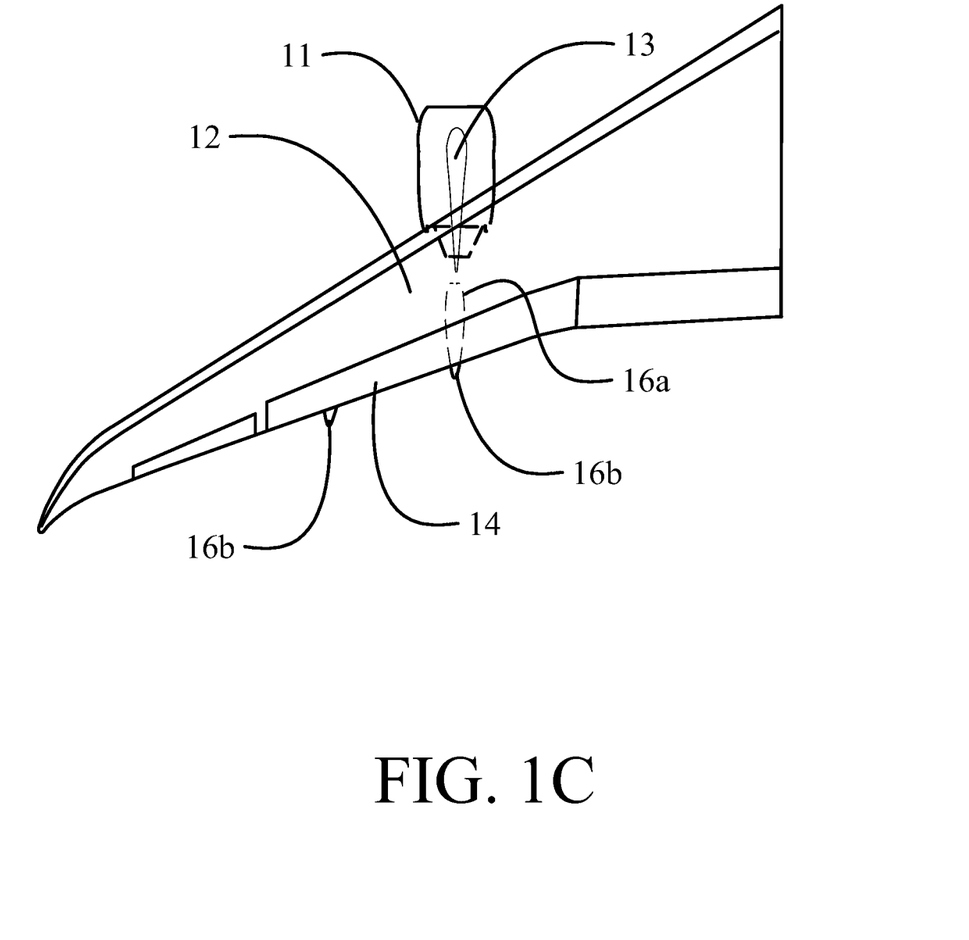
FIG. 1C is a top view of the wing and flaps of FIG. 1B.

Referring to the drawings, FIGS. 1A-1C depict an aircraft 10 having a wing 12 with operating flaps 14. The flaps 14 are engaged to the wing 12 at multiple attachment points with underwing structures partially housed within fairings 16. Extension of the flaps 14 to enhance aerodynamic performance during takeoff and landing is accomplished with a flap deployment system that causes the flaps 14 and at least a portion of the fairings (aft fairing 16*b*) to rotate downward relative to the wing 12 as seen in FIG. 1B. One or more engines 11 are typically mounted on pylons 13 below the wing 12. In certain aircraft configurations, the centerline of an engine 11 aligns with one of the fairings 16 as seen in FIG. 1C. In the deployed position, the fairing 16 deploys downward into the exhaust flow of the engine.

Figure 2A:
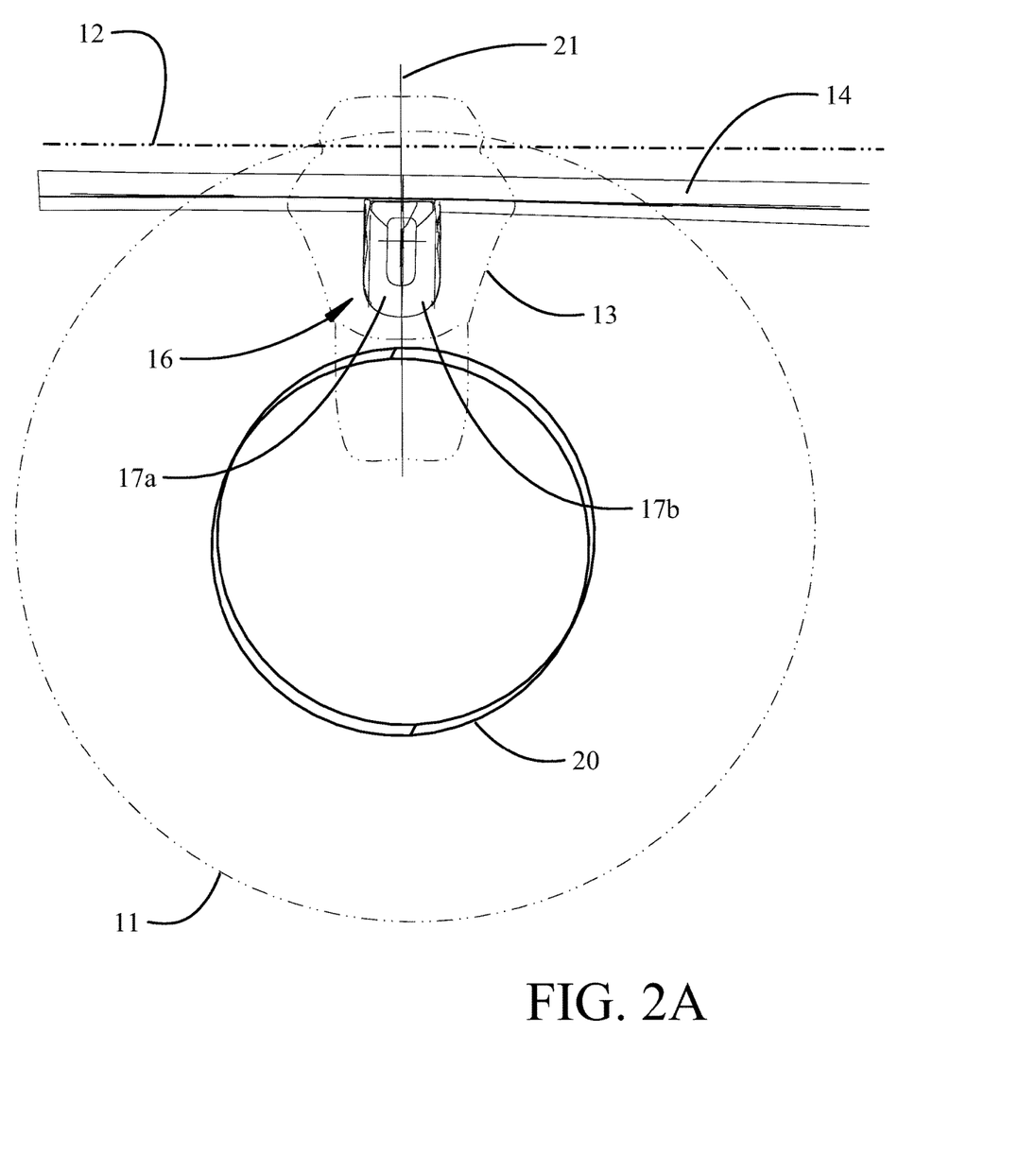
FIG. 2A is an aft view of an example implementation of an example implementation of the butterfly folding fairing and flap in the retracted and closed position showing the wing, engine and pylon in phantom with the engine exhaust stream core represented as a phantom cylinder.
Figure 2B:
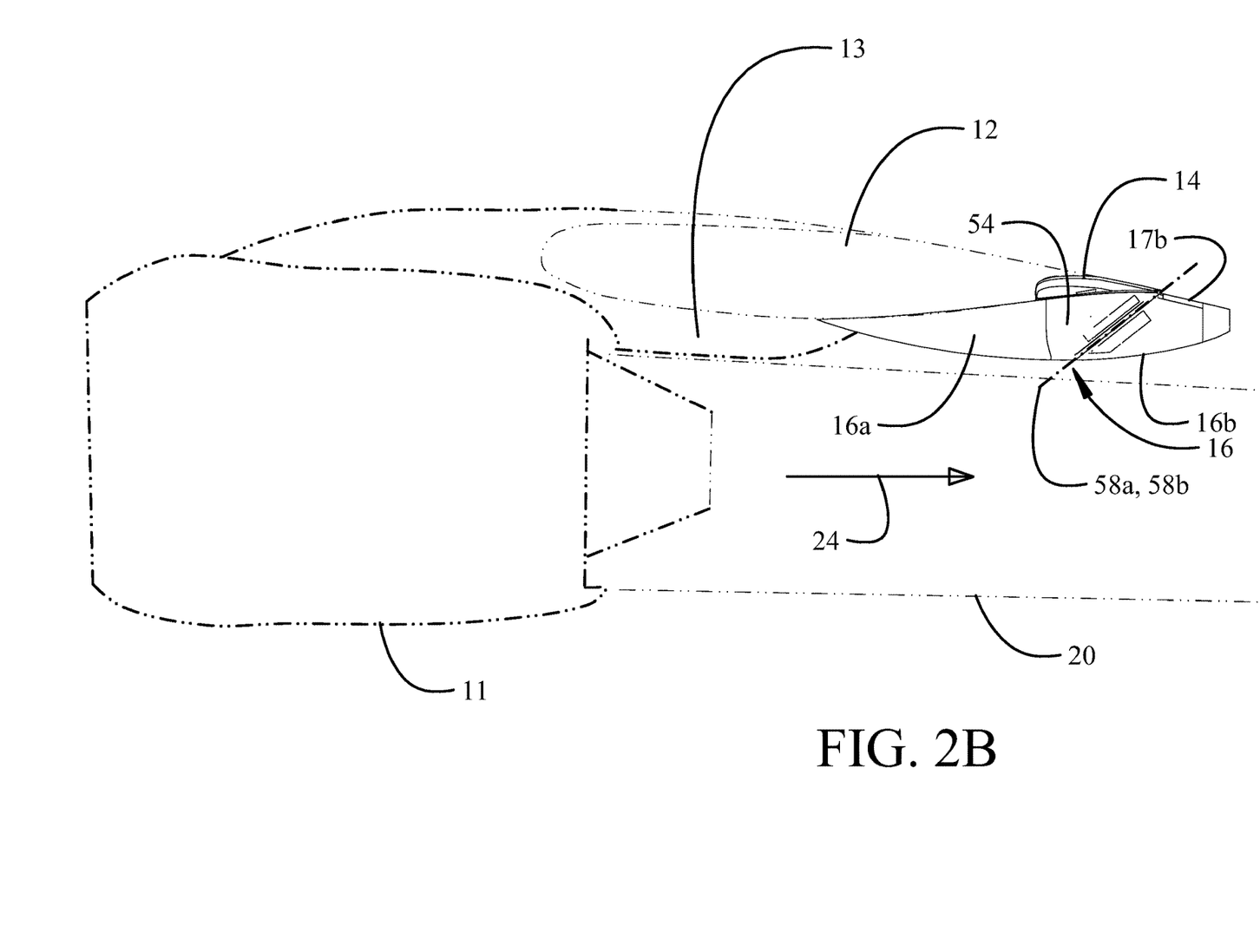
FIG. 2B is an outboard view of the implementation of FIG. 2A.
Figure 3:
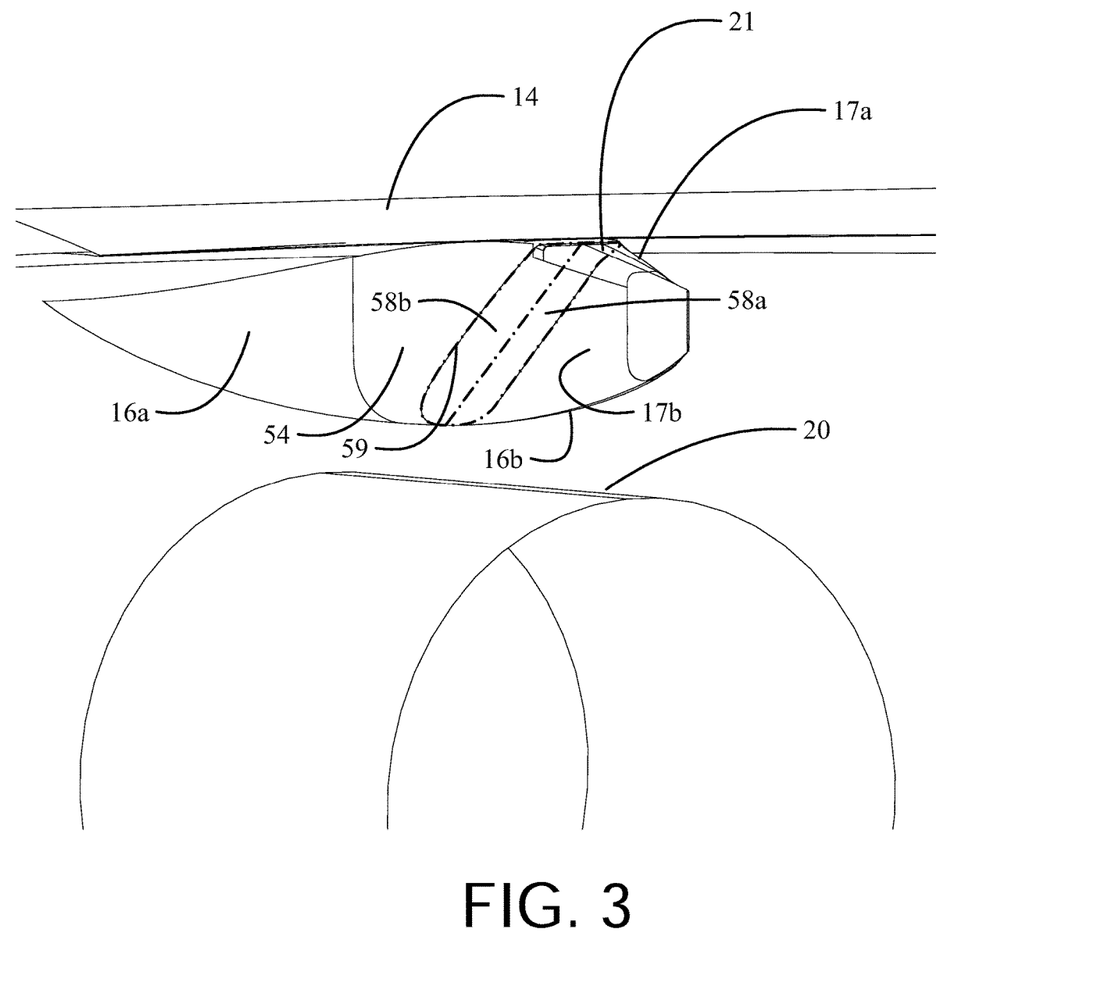
FIG. 3 is an aft pictorial view of the example implementation with the flap and fairing in the retracted position.

FIG. 2A shows an aft view of the engine 11 (in phantom), wing 12, flap 14 and fairing 16 with the flap in the fully retracted position. In the example implementation a forward fairing 16a and an aft fairing 16b are employed with the forward fairing 16a aerodynamically shielding the flap support and deployment mechanism from an airflow and the aft fairing 16b attached to the flap 14 and providing aerodynamic continuity with the forward fairing when the flap in the fully retracted position. A core of the exhaust plume from the engine 11 (represented by phantom cylinder 20) can have high temperatures and exposure of the fairing to the flow in the exhaust core as the flap 14 and fairing 16 are deployed is undesirable. FIG. 2B shows an outboard view of the engine 11, wing 12, flap 14 and fairing 16 with the flap in the fully retracted position. FIG. 3 shows an aft pictorial view of the flap 14 and fairing 16 in the fully retracted position.

Figure 4A:
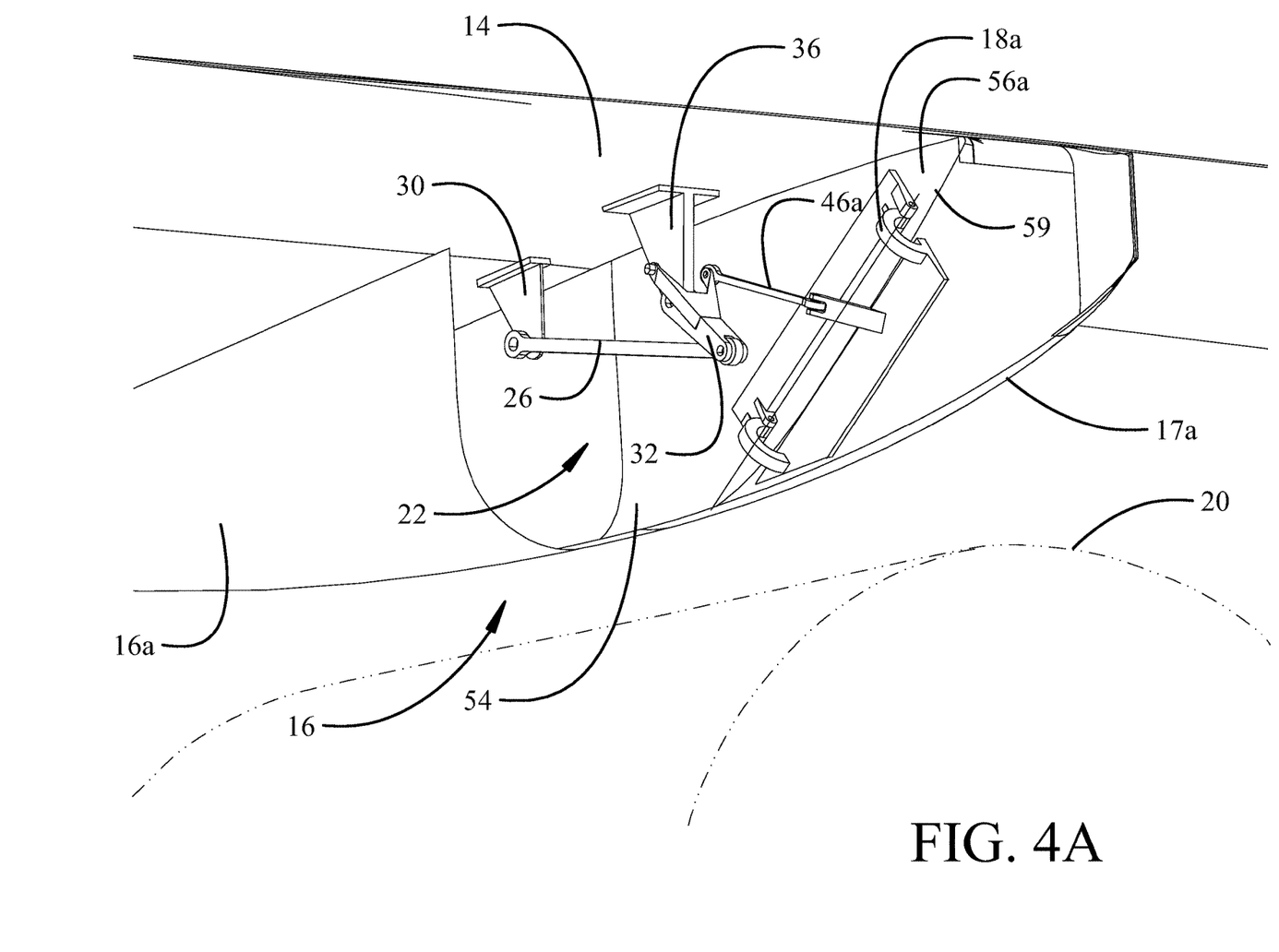
FIG. 4A is an aft pictorial view of the example implementation with the flap and fairing in the retracted position with the outboard butterfly portion removed to show the elements of the deployment mechanism.
Figure 4B:
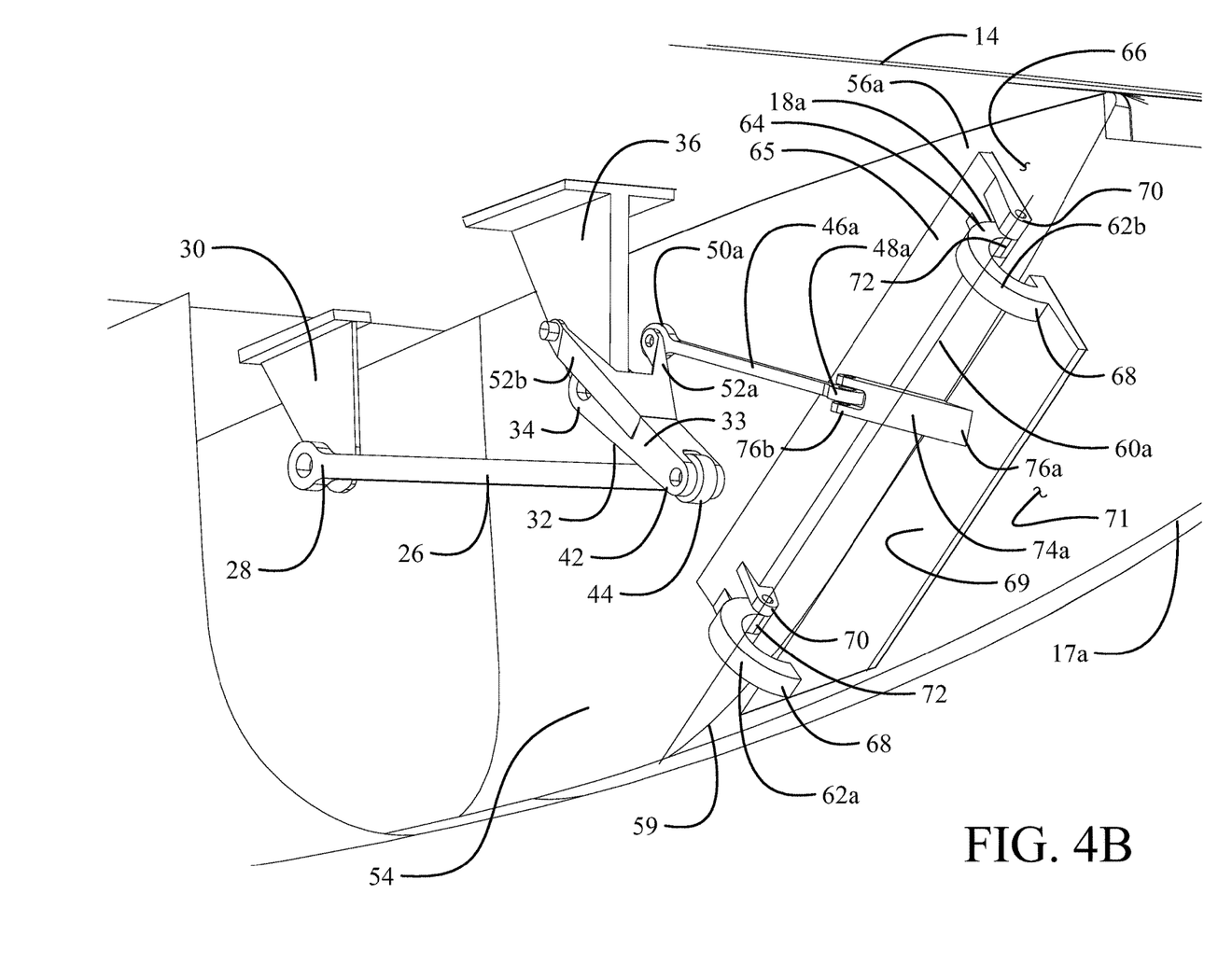
FIG. 4B is a detailed view of the deployment mechanism from FIG. 4A.

As seen in FIGS. 4A and 4B, the aft fairing 16b is attached to the flap 14 and has an inboard butterfly portion 17a mounted with an inboard hinge 18a and an outboard butterfly portion 17b (removed from FIG. 4A for clarity and seen in subsequent drawings) mounted with in outboard hinge 18b (see in subsequent drawings). The inboard butterfly portion and outboard butterfly portion separate on a split plane 21 (seen in FIG. 2A). The aft fairing 16b is deployed downward with the flap 14 during flap extension, as will be described in greater detail subsequently. A fairing deployment mechanism 22 is responsive to flap extension and is configured to rotate the inboard butterfly portion 17a laterally inboard about the inboard hinge 18a relative to an airflow direction 24 (seen in FIG. 2B). The fairing deployment mechanism 22 also rotates the outboard butterfly portion 17b laterally outboard about the outboard hinge 18b relative to the airflow direction 24. Upon flap extension, rotation of the inboard and outboard butterfly portions 17a, 17b reduces impingement of the core of the exhaust plume 20 on the deployed fairing 16.

The fairing deployment mechanism 22 is seen in detail in FIG. 4B. An actuator rod 26 is pivotally connected at a forward end 28 to a fixed wing structure 30. A bellcrank 32 is pivotally connected at a first end 34 to a flap fitting 36 fixed to the flap 14 and pivotally connected at a second end 42 to an aft end 44 of the actuator rod 26. An inboard operating link 46a is pivotally connected at an aft end 48a to the inboard butterfly portion 17a and pivotally connected at a forward end 50a to the bellcrank 32. An outboard operating link 46b is pivotally connected at an aft end 48b to the outboard butterfly portion 17b and pivotally connected at a forward end 50b to the bellcrank 32. The bellcrank 32 has a body 33 extending between the first and the second ends 34, 42. An inboard arm 52a extends inboard from the body 33 and the forward end 50a of the inboard operating link 46a is pivotally connected to the inboard arm 52a distal from the body 33. Similarly, (as seen in subsequent drawings) an outboard arm 52b extends outboard from the body 33 and the forward end 50b of the outboard operating link 46b is pivotally connected to the outboard arm 52b distal from the body.

In the example implementation in the drawings, the aft fairing 16b further comprises a forward portion 54 (shown sectioned on the split plane 21 with the outboard portion removed in FIGS. 4A and 4B to expose the fairing deployment mechanism) mounted to the flap 14. The inboard hinge 18a rotatably attaches the inboard butterfly portion 17a to an inboard side 56a of the forward portion 54 proximate an inboard separation plane 58a between the forward portion 54 and the inboard butterfly portion 17a (seen in FIG. 2B). The outboard hinge 18b rotatably attaches the outboard butterfly portion 17b to an outboard side 56b (seen in FIG. 5B) of the forward portion 54 at an outboard separation plane 58b between the forward portion 54 and the outboard butterfly portions 17b (seen in FIG. 2B). For the implementation shown in the drawings, the inboard and outboard separation planes are coplanar. In alternative implementations, the planes may be angled relative to one another. The inboard hinge 18a and the outboard hinge 18b each have an axis of rotation 60a, 60b substantially parallel to the airflow direction 24 when the flap 14 and fairing 16 are fully deployed (seen subsequently in FIGS. 5E and 6E). The inboard and outboard separation planes, 58a, 58b separate the butterfly portions at a trailing edge 59 of the forward portion 54.

To provide clearance for the rotating butterfly portions, the inboard hinge 18a and the outboard hinge 18b each incorporate a forward semicircular hinge element 62a and an aft semicircular hinge element 62b. Each forward and aft semicircular hinge element 62a, 62b is rotatably connected at a first end 64 to a backing plate 65 on an interior surface 66 of the inboard side 56a of the forward portion 54 or of the outboard side 56b of the forward portion 54. Axis pin receivers 70 on the backing plate 65 align on the respective axis of rotation 60a, 60b with mating bores 72 in the first ends 64 of the forward and aft semicircular hinge elements 62a, 62b. Each forward and aft semicircular hinge element 62a, 62b is attached at a second end 68 to a second backing plate 69 an interior surface 71 of the inboard butterfly portion 17a or of outboard butterfly portion 17b, respectively.

To further enhance the clearance of the rotating elements, an inboard standoff 74a has an inboard end 76a connected to the interior surface 71 of the inboard butterfly portion 17a and an outboard end 76b rotatably connected to the aft end 48a of the inboard operating link 46a. Similarly, an outboard standoff 74b (best seen in FIG. 5B) has an outboard end 78a connected to the interior surface 71 of the outboard butterfly portion 17b and an inboard end 78b rotatably connected to the aft end 48b of the outboard operating link 46b, such that clearance is provided for the inboard and outboard operating links 46a, 46b from the trailing edge 59 of the forward portion 54 of the aft fairing 16b at the inboard and outboard separation planes 58a, 58b.

Figure 5A:
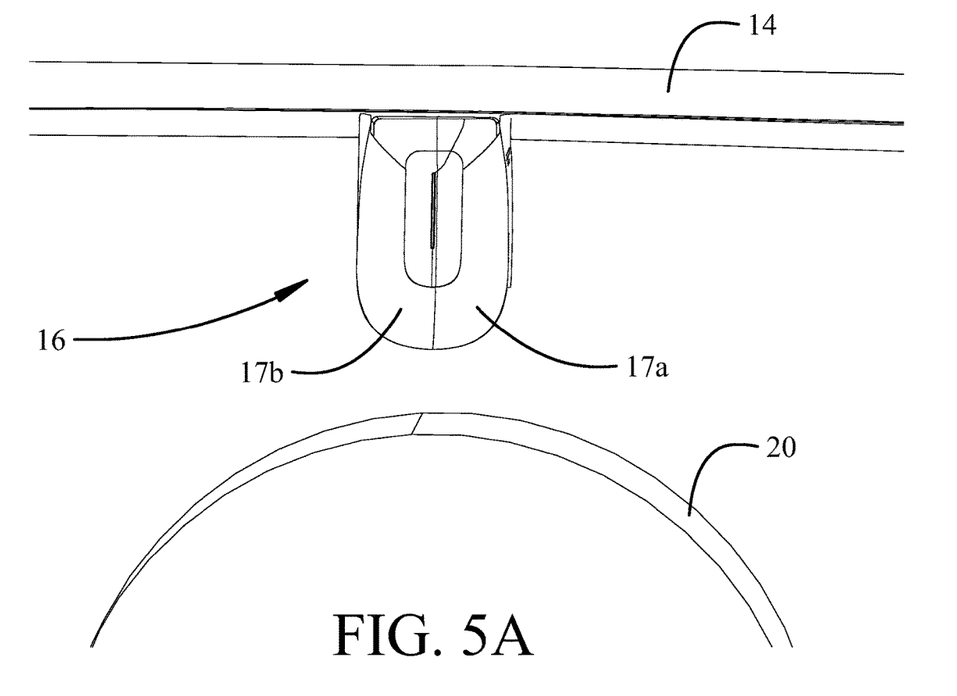
FIG. 5A is a detailed aft view of the example implementation with the flap and fairing in the retracted position.
Figure 5B:
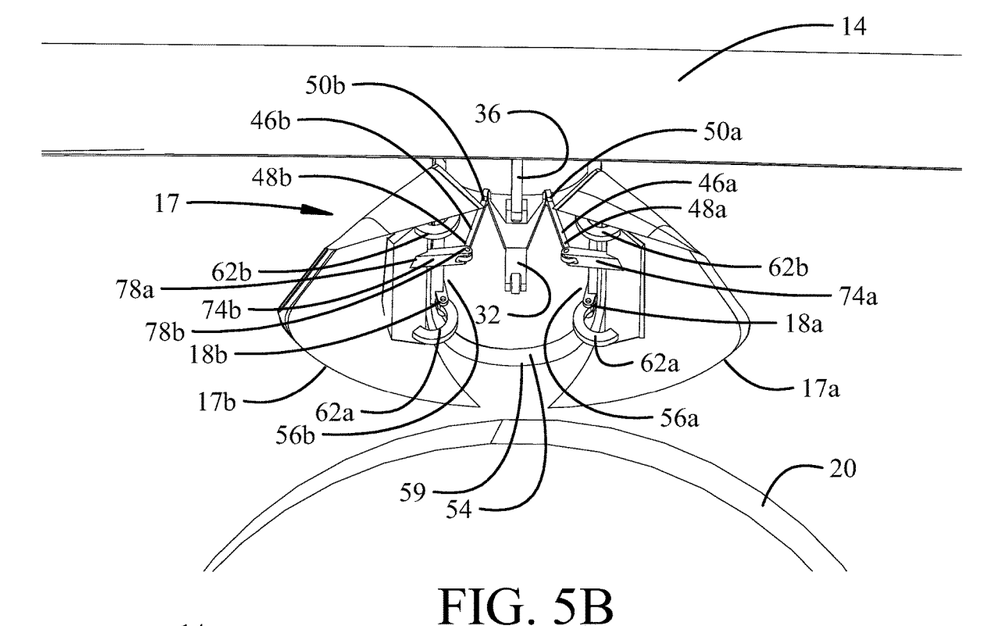
FIG. 5B is a detailed aft view of the example implementation with the flap and fairing in the 25 percent deployed position.
Figure 5C:
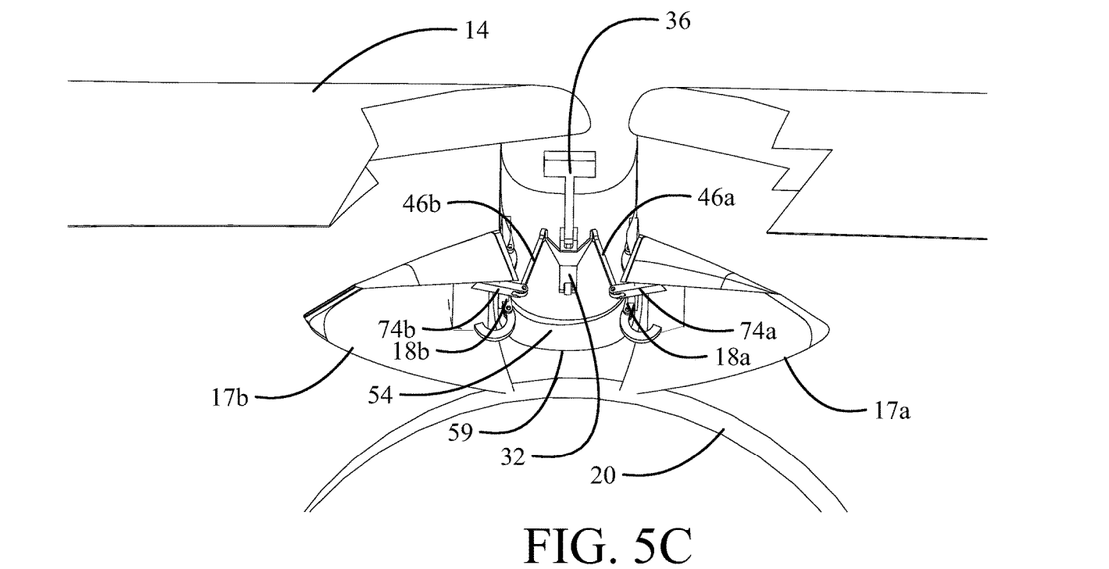
FIG. 5C is a detailed aft view of the example implementation with the flap and fairing in the 50 percent deployed position.
Figure 5D:
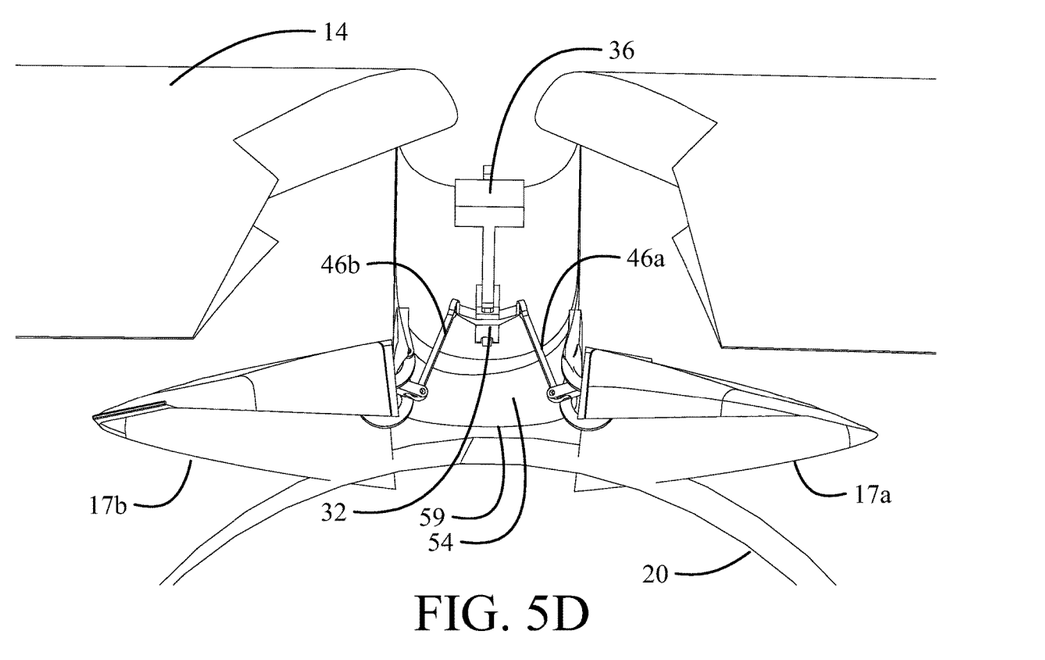
FIG. 5D is a detailed aft view of the example implementation with the flap and fairing in the 75 percent deployed position.
Figure 5E:
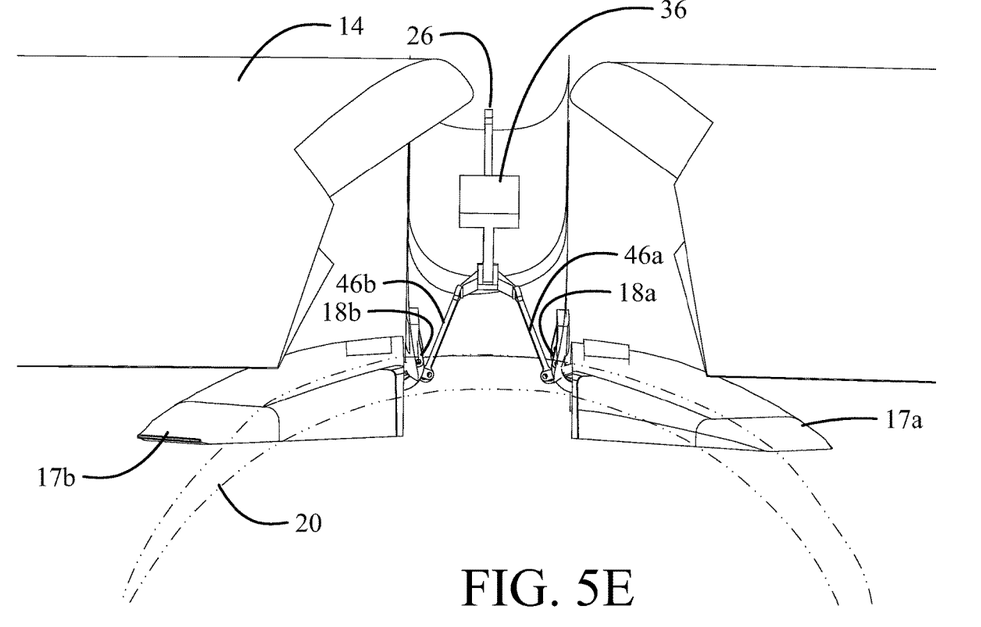
FIG. 5E is a aft side view of the example implementation with the flap and fairing in the 100 percent deployed position.
Figure 6A:
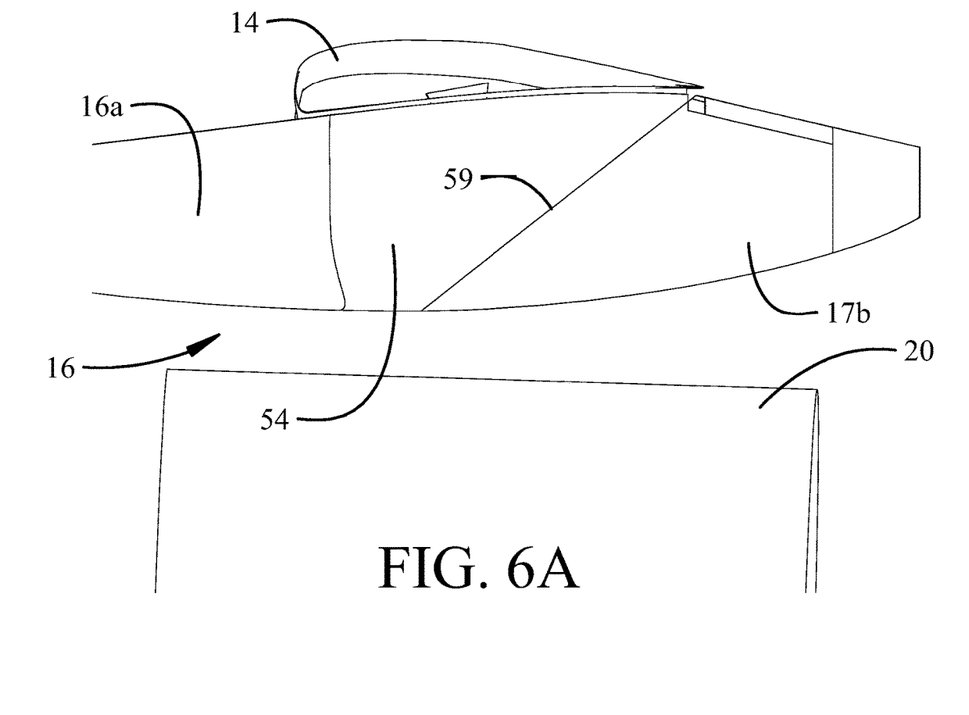
FIG. 6A is a detailed side view of the example implementation with the flap and fairing in the retracted position.
Figure 6B:
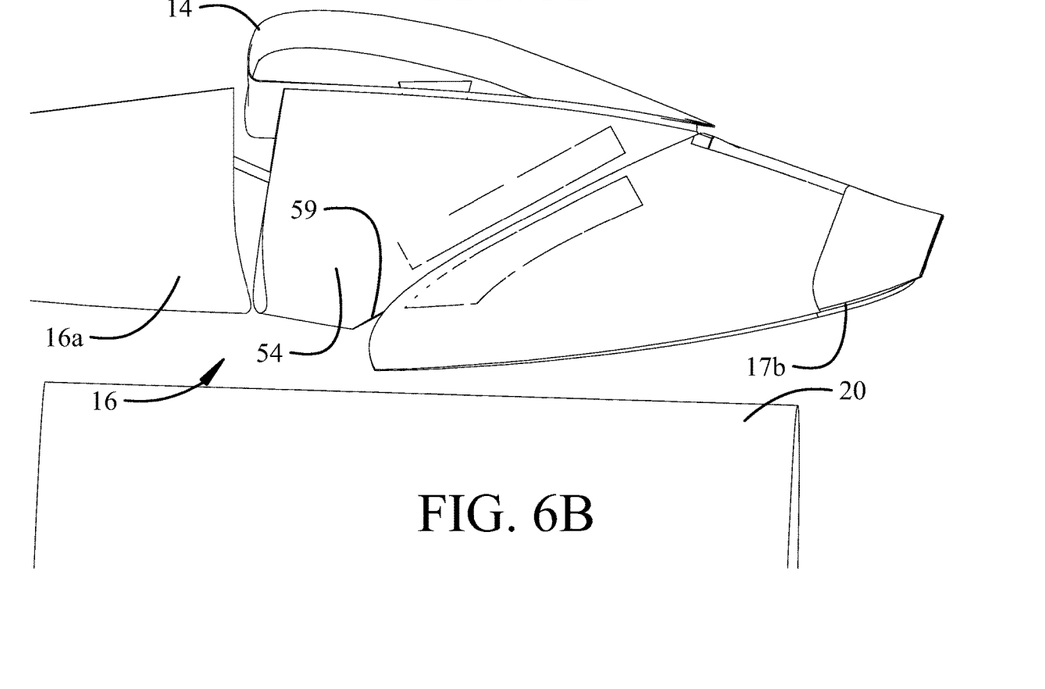
FIG. 6B is a detailed side view of the example implementation with the flap and fairing in the 25 percent deployed position with the flap cutaway to show the fairing and deployment mechanism.
Figure 6C:
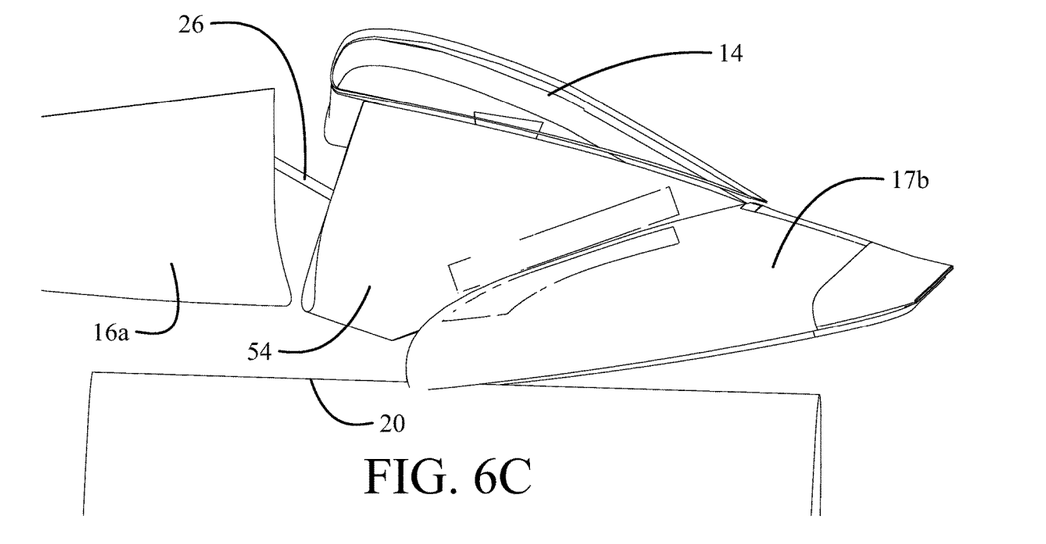
FIG. 6C is a detailed side view of the example implementation with the flap and fairing in the 50 percent deployed position with the flap cutaway to show the fairing and deployment mechanism.
Figure 6D:
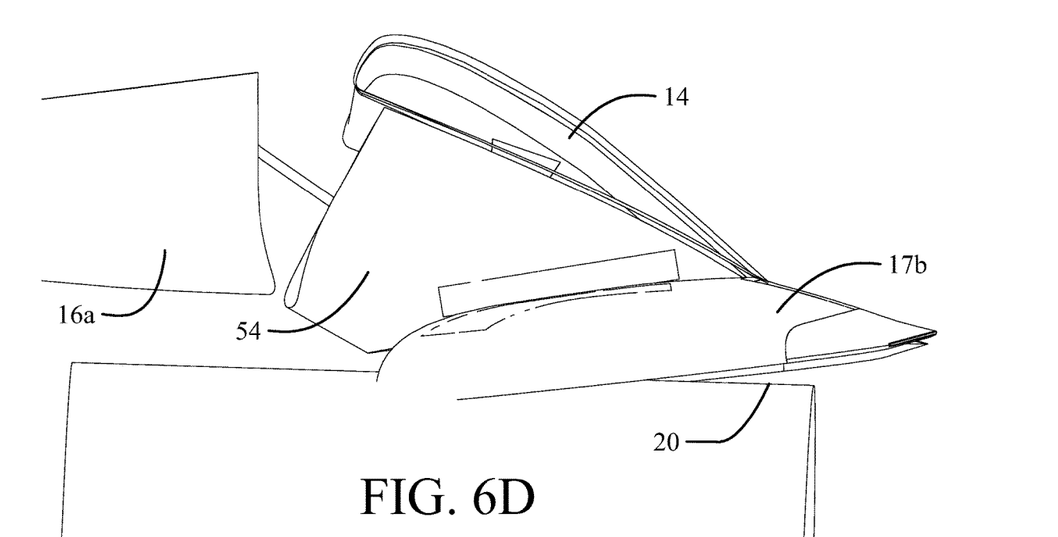
FIG. 6D is a detailed side view of the example implementation with the flap and fairing in the 75 percent deployed position with the flap cutaway to show the fairing and deployment mechanism.
Figure 6E:
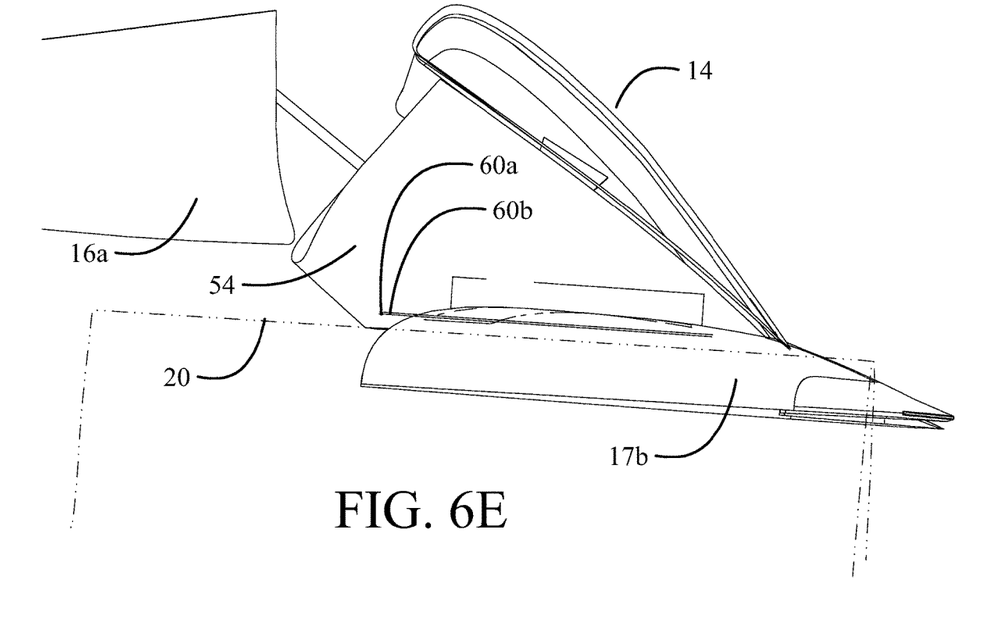
FIG. 6E is a detailed side view of the example implementation with the flap and fairing in the 100 percent deployed position with the flap cutaway to show the fairing and deployment mechanism.
Figure 7:
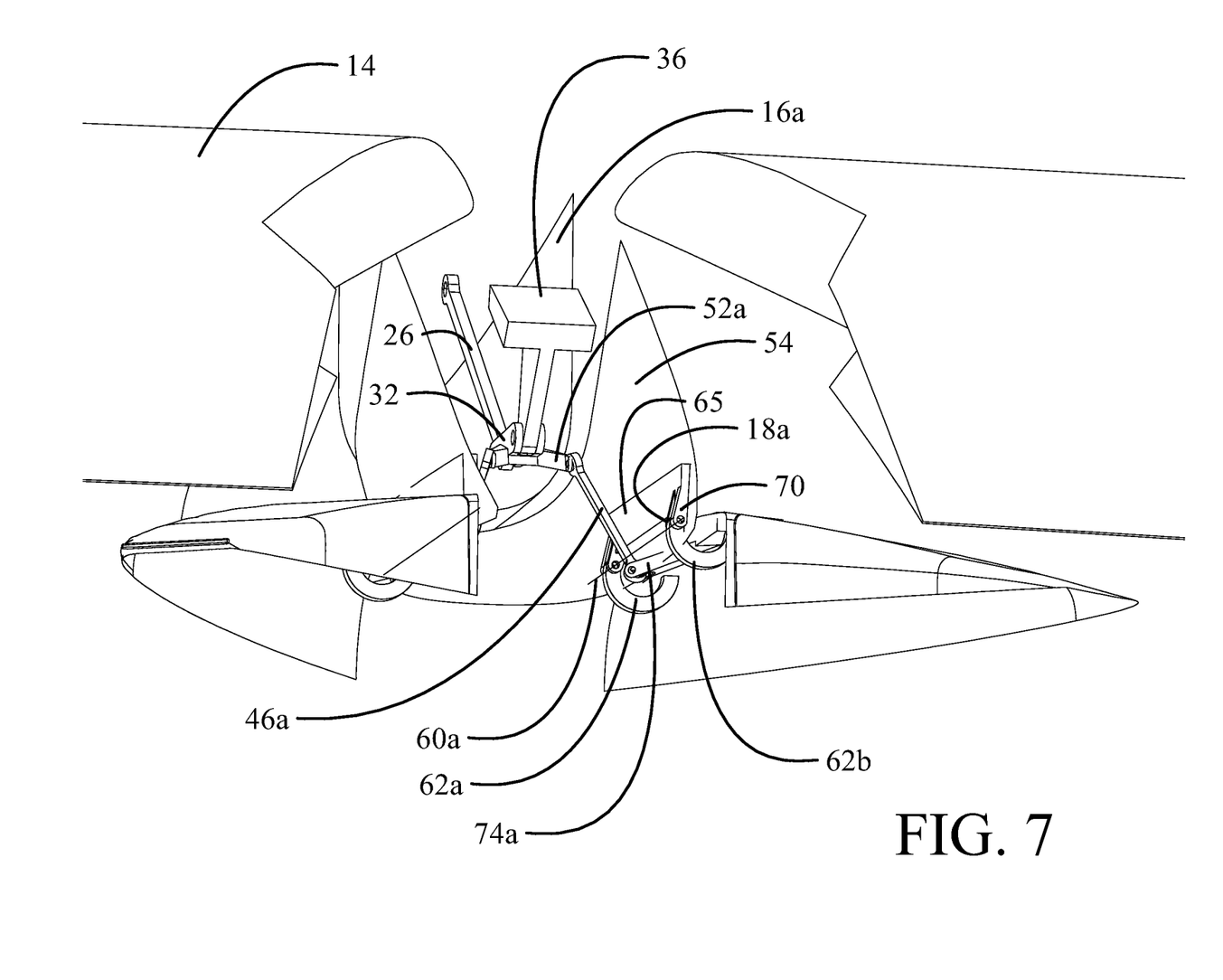
FIG. 7 a detailed aft pictorial view of the example implementation with the flap and fairing in the 100 percent deployed position; and, FIG. 8 is a flow chart of a method for flap deployment and backup loading of the catcher link using the exemplary implementations.

The flap 14 is deployed over a range of deployed positions between a retracted position and a lowered or deployed position as represented in FIGS. 5A-5E and 6A-6E. FIGS. 5A and 6A show the flap 14 and flap deployment system 19 in the fully retracted position. FIGS. 5B and 6B show a 25% partially extended position. FIGS. 5C and 6C show a 50% extended position. FIGS. 5D and 6D show a 75% extended position and FIGS. 5E and 6E show the fully extended position. An aft pictorial view of the fully deployed flap 14 with full rotation of the inboard and outboard butterfly portions is shown in FIG. 7. As seen in FIGS. 5E, 6E and 7, the axis of rotation, 60a, 60b of the inboard and outboard hinges 18a, 18b is substantially parallel to the airflow direction allowing the inboard and outboard butterfly portions 17a, 17b to have significantly reduced impingement by the core of the exhaust plume 20.

Figure 8:
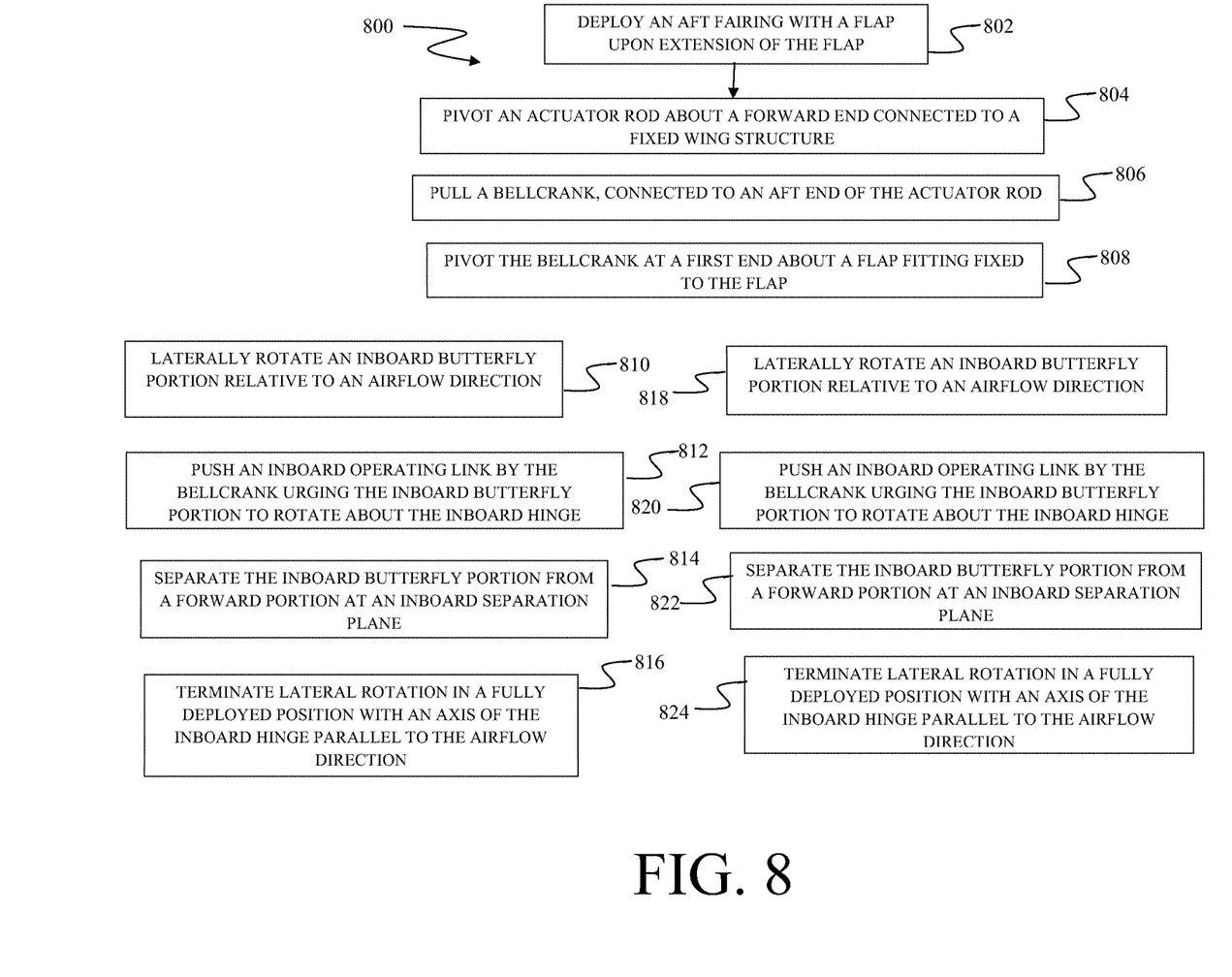

The implementations disclosed herein provide a method 800 as shown in FIG. 8 for reducing impingement of a core engine plume on a flap support fairing. The method incorporates deploying an aft fairing with a flap upon extension of the flap, step 802, by pivoting an actuator rod about a forward end pivotally connected to a fixed wing structure, step 804, and pulling a bellcrank, connected to an aft end of the actuator rod, step 806, to pivot at a first end about a flap fitting fixed to the flap, step 808. An inboard butterfly portion of the fairing is laterally rotated relative to an airflow direction, step 810, the inboard butterfly portion being mounted with an inboard hinge. An inboard operating link, pivotally connected at a forward end to the bellcrank and at an aft end to the inboard butterfly portion, is pushed by the bellcrank urging the inboard butterfly portion, with the aft end of the inboard operating link, to rotate about the inboard hinge, step 812. The inboard butterfly portion is separated from the forward portion at the inboard separation plane, step 814, and the lateral rotation terminates in a fully deployed position with an axis of the inboard hinge parallel to the airflow direction, step 816. Similarly, an outboard butterfly portion of the fairing is laterally rotated relative to the airflow direction, step 818, the outboard butterfly portion being mounted with an outboard hinge. An outboard operating link, pivotally connected at a forward end to the bellcrank and at an aft end to the outboard butterfly portion, is pushed by the bellcrank urging the outboard butterfly portion, with the aft end of the outboard operating link, to rotate about the outboard hinge, step 820. The outboard butterfly portion separates from the forward portion at the outboard separation plane, step 822, and the lateral rotation in a fully deployed position terminates with an axis of the outboard hinge parallel to the airflow direction, step 824.

Having now described various implementations of the disclosure in detail as required by the patent statutes, those skilled in the art will recognize modifications and substitutions to the specific implementations disclosed herein. Such modifications are within the scope and intent of the following claims. Within the claims the terms "comprising", "incorporating", "including", "having" and "containing" are intended to be open and additional or equivalent elements may be present.

What is claimed is:

1. A flap support fairing system comprising:
    a fairing attached to a flap and having an inboard butterfly portion mounted with an inboard hinge and an outboard butterfly portion mounted with an outboard hinge, said fairing deployed downward with the flap during flap extension; and
    a fairing deployment mechanism responsive to flap extension and configured to rotate the inboard butterfly portion laterally inboard about the inboard hinge relative to an airflow direction and to rotate the outboard butterfly portion laterally outboard about the outboard hinge relative to the airflow direction;
    wherein the fairing deployment mechanism comprises: an actuator rod pivotally connected at a forward end to a fixed wing structure; a bellcrank pivotally connected at a first end to a flap fitting fixed to the flap and pivotally connected at a second end to an aft end of the actuator rod; an inboard operating link pivotally connected at an aft end to the inboard butterfly portion and pivotally connected at a forward end to the bellcrank; and an outboard operating link pivotally connected at an aft end to the outboard butterfly portion and pivotally connected at a forward end to the bellcrank;
    wherein, upon flap extension, rotation of the inboard and outboard butterfly portions reduce impingement of a core engine plume on the fairing as deployed.

2. The flap support fairing system as defined in claim 1 wherein the bellcrank has
    a body extending between the first and the second end,
    an inboard arm extending inboard from the body, the forward end of the inboard operating link pivotally connected to the inboard arm distal from the body, and
    an outboard arm extending outboard from the body, the forward end of the outboard operating link pivotally connected to the outboard arm distal from the body.

3. The flap support fairing system as defined in claim 1 wherein the fairing further comprises a forward portion mounted to the flap, the inboard hinge rotatably attaching the inboard butterfly portion to an inboard side of the forward portion and the outboard hinge rotatably attaching the outboard butterfly portion to an outboard side of the forward portion, the inboard hinge and the outboard hinge each having an axis of rotation substantially parallel to the airflow direction when the flap and fairing are fully deployed.

4. The flap support fairing system as defined in claim 3 wherein the inboard hinge and the outboard hinge each comprise at least one semicircular hinge element rotatably connected at a first end to an interior surface of the inboard side of the forward portion or of the outboard side of the forward portion and at a second end to an interior surface of the inboard butterfly portion or of the outboard butterfly portion, respectively.

5. The flap support fairing system as defined in claim 4 wherein, in a fully retracted position, the inboard butterfly portion meets the forward portion at an inboard separation plane and the outboard butterfly portion meets the forward portion at an outboard separation plane, the inboard separation plane being substantially parallel to the axis of rotation of the inboard hinge, and the outboard separation plane being substantially parallel to the axis of rotation of the outboard hinge.

6. The flap support fairing system as defined in claim 5 further comprising:
    an inboard standoff having an inboard end connected to the interior surface of the inboard butterfly portion and an outboard end rotatably connected to the aft end of the inboard operating link; and,
    an outboard standoff having an outboard end connected to the interior surface of the outboard butterfly portion and an inboard end rotatably connected to the aft end of the outboard operating link, such that clearance is provided for the inboard and outboard operating links from a trailing edge of the forward portion at the inboard and outboard separation planes.

7. The flap support fairing system as defined in claim 6 wherein the at least one semicircular hinge element comprises a forward semicircular hinge element and an aft semicircular hinge element.

8. The flap support fairing system as defined in claim 7 wherein the inboard and outboard standoffs are between the forward and aft semicircular hinge elements.

9. A flap support fairing and deployment mechanism comprising:
    a fairing attached to a flap and having an inboard butterfly portion and an outboard butterfly portion configured to rotate laterally relative to an airflow direction, said fairing being deployed with the flap during flap extension;
    an actuator rod pivotally connected at a forward end to a fixed wing structure;
    a bellcrank pivotally connected at a first end to a flap fitting fixed to the flap and pivotally connected at a second end to an aft end of the actuator rod;
    an inboard operating link pivotally connected at an aft end to the inboard butterfly portion and pivotally connected at a forward end to the bellcrank; and
    an outboard operating link pivotally connected at an aft end to the outboard butterfly portion and pivotally connected at a forward end to the bellcrank;

wherein, upon flap extension, the actuator rod induces rotation of the bellcrank about the flap fitting thereby urging the inboard operating link to rotate the inboard butterfly portion and the outboard operating link to rotate the outboard butterfly portion, reducing impingement of a core engine plume on the fairing as deployed.

10. The flap support fairing and deployment mechanism as defined in claim 9 wherein the bellcrank has
a body extending between the first and the second end,
an inboard arm extending inboard from the body, the forward end of the inboard operating link pivotally connected to the inboard arm distal from the body, and
an outboard arm extending outboard from the body, the forward end of the outboard operating link pivotally connected to the outboard arm distal from the body.

11. The flap support fairing and deployment mechanism as defined in claim 9 wherein the fairing further comprises a forward portion mounted to the flap, an inboard hinge rotatably attaching the inboard butterfly portion to an inboard side of the forward portion and an outboard hinge rotatably attaching the outboard butterfly portion to an outboard side of the forward portion, the inboard hinge and the outboard hinge each having an axis of rotation substantially parallel to the airflow direction when the flap and aft fairing are fully deployed.

12. The flap support fairing and deployment mechanism as defined in claim 11 wherein the inboard hinge and the outboard hinge each comprise at least one semicircular hinge element rotatably connected at a first end to an interior surface of the inboard side of the forward portion or the outboard side of the forward portion and at a second end to an interior surface of the inboard butterfly portion or the outboard butterfly portion, respectively.

13. The flap support fairing and deployment mechanism as defined in claim 12 wherein, in a fully retracted position, the inboard butterfly portion meets the forward portion at an inboard separation plane, and the outboard butterfly portion meets the forward portion at an outboard separation plane, the inboard separation plane being substantially parallel to the axis of rotation of the inboard hinge, and the outboard separation plane being substantially parallel to the axis of rotation of the outboard hinge.

14. A wing structure comprising:
a wing;
a flap mounted to the wing with a flap support and deployment mechanism configured to extend and retract the flap over a range of deployed positions from a fully retracted position to a fully extended position;
a forward fairing attached to the wing and aerodynamically shielding the flap support and deployment mechanism from an airflow;
an aft fairing attached to the flap and providing aerodynamic continuity with the forward fairing when the flap is in the fully retracted position, said aft fairing being deployed with the flap during flap extension and having
a forward portion mounted to the flap;
an inboard butterfly portion mounted with an inboard hinge to an inboard side of the forward portion; and
an outboard butterfly portion mounted with an outboard hinge to an outboard side of the forward portion;
a fairing deployment mechanism having
an actuator rod pivotally connected at a forward end to a fixed wing structure;
a bellcrank pivotally connected at a first end to a flap fitting fixed to the flap and pivotally connected at a second end to an aft end of the actuator rod;
an inboard operating link pivotally connected at an aft end to the inboard butterfly portion and pivotally connected at a forward end to the bellcrank; and
an outboard operating link pivotally connected at an aft end to the outboard butterfly portion and pivotally connected at a forward end to the bellcrank;
wherein, upon flap extension, the actuator rod induces rotation of the bellcrank about the flap fitting thereby urging the inboard operating link to rotate the inboard butterfly portion about the inboard hinge, and the outboard operating link to rotate the outboard butterfly portion about the outboard hinge, said inboard hinge and said outboard hinge each have an axis of rotation substantially parallel to an airflow direction when the flap and aft fairing are in a fully deployed position upon flap extension, thereby reducing impingement of a core engine plume on the aft fairing when the flap is in the fully extended position.

15. A method for reducing impingement of a core engine plume on a flap support fairing, the method comprising:
deploying an aft fairing with a flap upon extension of the flap;
laterally rotating an inboard butterfly portion of the aft fairing relative to an airflow direction, the inboard butterfly portion being mounted with an inboard hinge;
pivoting an actuator rod about a forward end pivotally connected to a fixed wing structure; pulling a bellcrank, connected to an aft end of the actuator rod, to pivot at a first end about a flap fitting fixed to the flap; and
wherein the step of laterally rotating an inboard butterfly portion comprises: pushing an inboard operating link pivotally connected at a forward end to the bellcrank and at an aft end to the inboard butterfly portion; and urging the inboard butterfly portion, with the aft end of the inboard operating link, to rotate about the inboard hinge; and
laterally rotating an outboard butterfly portion of the aft fairing relative to the airflow direction, the outboard butterfly portion being mounted with an outboard hinge.

16. The method as defined in claim 15 wherein the step of laterally rotating an outboard butterfly portion comprises:
pushing an outboard operating link pivotally connected at a forward end to the bellcrank and at an aft end to the outboard butterfly portion; and
urging the outboard butterfly portion, with the aft end of the outboard operating link, to rotate about the outboard hinge.

17. The method as defined in claim 15 wherein the inboard butterfly portion meets a forward portion at an inboard separation plane and the step of urging the inboard butterfly portion comprises:
separating the inboard butterfly portion from the forward portion at the inboard separation plane; and
terminating the lateral rotation in a fully deployed position with an axis of an inboard hinge parallel to the airflow direction.

18. The method as defined in claim 16 wherein the outboard butterfly portion meets a forward portion at an outboard separation plane and the step of urging the outboard butterfly portion comprises:
separating the outboard butterfly portion from the forward portion at the outboard separation plane; and terminating the lateral rotation in a fully deployed position with an axis of an outboard hinge parallel to the airflow direction.

\* \* \* \* \*